United States Patent [19]

Pryor et al.

[11] Patent Number: 4,547,674
[45] Date of Patent: Oct. 15, 1985

[54] OPTICAL TRIANGULATION GEAR INSPECTION

[75] Inventors: Timothy R. Pryor, Tecumseh; Omer L. Hageniers; Walter P. T. North, both of Windsor, all of Canada

[73] Assignee: Diffracto Ltd., Windsor, Canada

[21] Appl. No.: 433,644

[22] Filed: Oct. 12, 1982

[51] Int. Cl.[4] .................................... G01H 21/86
[52] U.S. Cl. ............................. 250/560; 356/376
[58] Field of Search ............... 356/376, 377, 1; 250/560, 561; 364/560, 561, 562, 563, 554

[56] References Cited

U.S. PATENT DOCUMENTS

| | | | |
|---|---|---|---|
| 3,006,074 | 10/1961 | Heller | 356/376 |
| 3,927,948 | 12/1975 | Cox et al. | 356/376 |
| 4,097,159 | 6/1978 | Strandberg | 356/376 |
| 4,226,536 | 10/1980 | Dreyfus et al. | 356/376 |
| 4,325,640 | 4/1982 | Dreyfus et al. | 356/376 |
| 4,349,274 | 9/1982 | Steele | 250/560 |
| 4,373,804 | 2/1983 | Pryor et al. | 356/376 |

Primary Examiner—David C. Nelms
Assistant Examiner—J. Gatto
Attorney, Agent, or Firm—Larson and Taylor

[57] ABSTRACT

This invention describes novel method and apparatus for inspecting gear geometry via optical triangulation. Preferred machine construction uses specialized geometrical relationships of sensor to gear, and specialized high accuracy photodetector array based laser triangulation sensor units of large range and high response speed.

28 Claims, 12 Drawing Figures

OPTICAL TRIANGULATION GEAR INSPECTION

BACKGROUND OF THE INVENTION

The recent advances in gear manufacture have led to the ability to produce gears in flexible machines that can be automatically loaded and unloaded by robotic handling means. The developments in gear inspection equipment have not kept pace, however, and a tremendous need exists today for highly accurate, fast inspection equipment that can verify and, if possible, feed back correction data to such machines.

Such equipment could be located after the gear manufacturing machines, taking gears from a line and perhaps serving more than one machine. The equipment could also be located in the machine serving to directly feed back data before the gear was off loaded. This latter case has the advantage that it can utilize the gear while it is still fixtured on the machine's arbor or centers and the cost and potential loss of accuracy and speed of refixturing in a separate inspection machine is not undergone. The disadvantage however is that one has to have inspection equipment for each machine and further that the inspection equipment has to be able to operate in the atmosphere of the machine, which can be difficult.

The answer to these needs, laser triangulation based equipment, is shown which answers both of the problems, post process and in-process plus recieving and audit inspection and measurement of gears.

DESCRIPTION OF PREFERRED EMBODIMENTS

Figure 3:
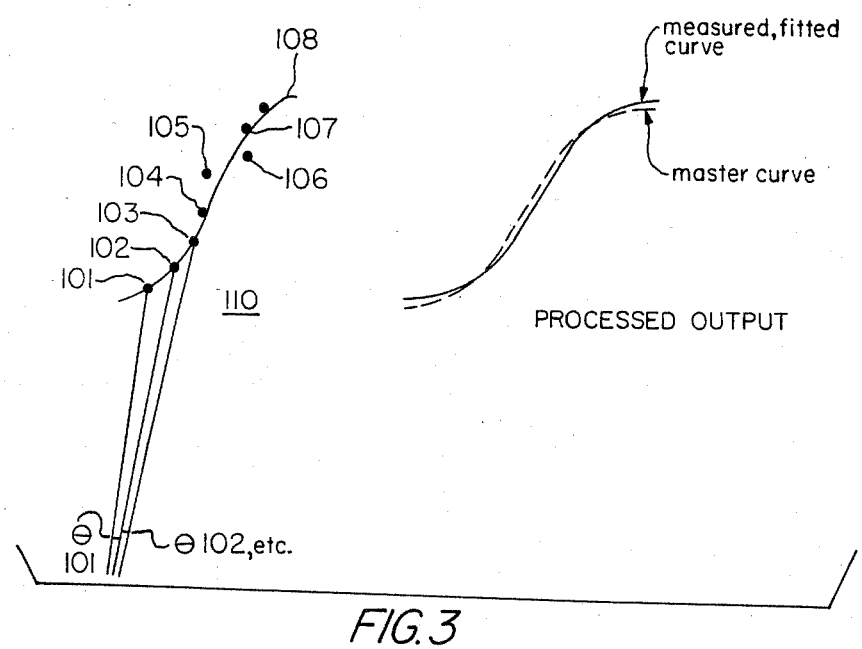

FIG. 3 schematically illustrates data processing to smooth data from gear teeth.

Figure 4:
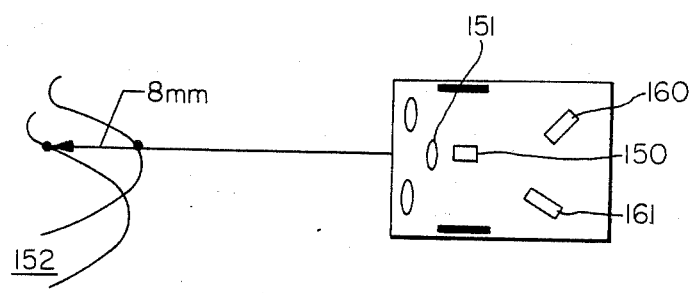

FIG. 4 illustrates a preferred large range, high speed, light compensating triangulation sensor capable of operation without interference in the gear rotation.

Figure 5:
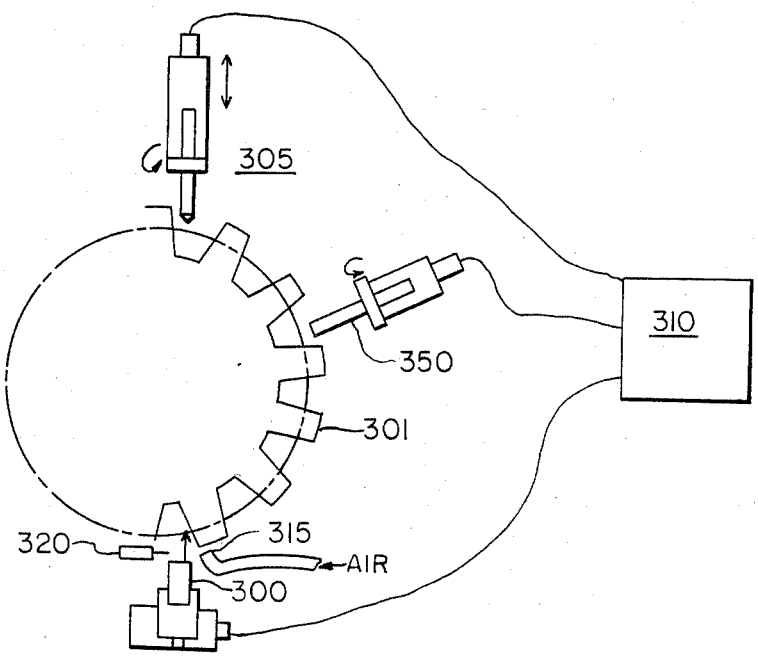

FIG. 5 illustrates a process control application of the invention.

Figure 6:
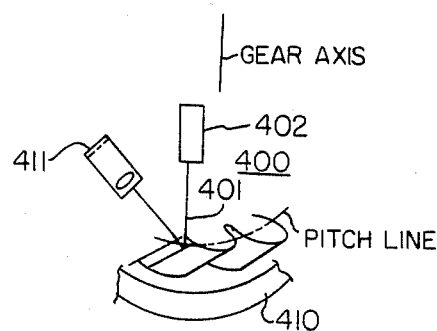

FIG. 6 illustrates use of the invention at a incidence angle oblique to the gear axis.

Figure 7:
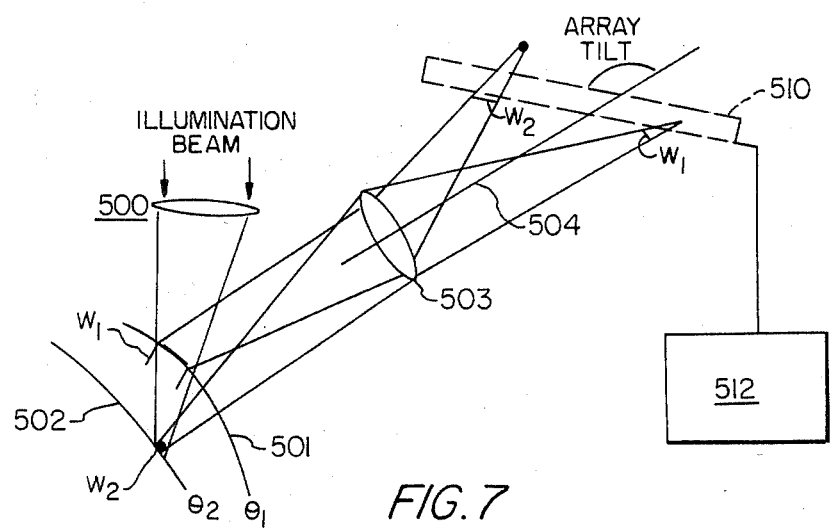

FIG. 7 illustrates a means of providing relatively constant image spot size.

Figure 8:
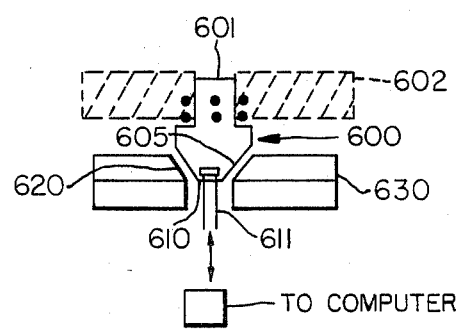

FIG. 8 illustrates a robotically interchangeable gear fixture.

Figure 9:
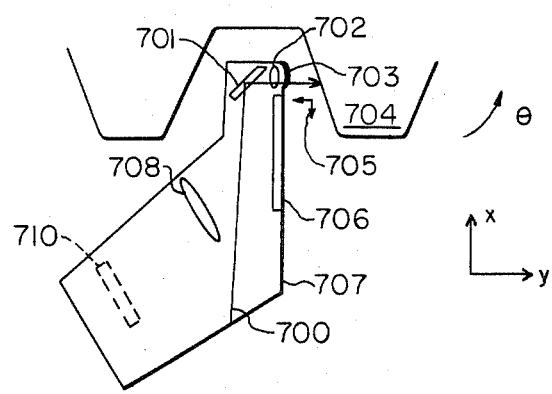

FIG. 9 illustrates a right angle viewing embodiment.

OPERATION

This invention is related to a copending application in which two of the inventors were co-inventors entitled "Method and apparatus for electro-optically determining the dimension, location and attitude of objects" (Ser. No. 34,278, now U.S. Pat. No. 4,373,804).

Figure 1A:
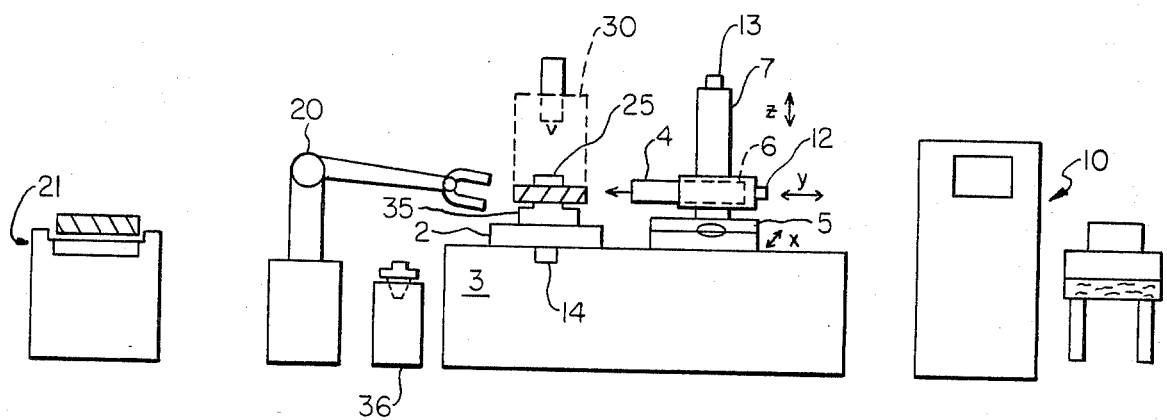
FIG. 1A illustrates an automatically loaded universal gear inspection machine according to the invention, including robotic fixture interchange.

FIG. 1A illustrates the basic gear inspection machine according to the invention. It includes a rotary table, moveable in angle $\theta$, 2, mounted to a substantial base 3, with a sensor unit 4 mounted on the slide assembly 5, 6 and 7 moveable in the x, y and z axes respectively for total flexibility. If such flexibility is not required, various axes motions can be removed.

The position of the x, y and $\theta$ axes of motions are each monitored by encoder means (not shown) and their motor actuators controlled by computer system 10. A suitable and preferable computer system is shown in the block diagram of FIG. 1B. A rotary encoder 35 is utilized to encode gear rotational positions. Other encoders (not shown) are used on the x, y and z axes to give the sensor position. The sensor unit is of a type described in a copending application Ser. No. 34,278. However, other sensor requirements can be somewhat different and are shown in detail herein (FIG. 4).

The machine is optionally loaded by robot system 20 which pulls parts from a conveyor line 21 and loads them on a fixture 25 which could be either an arbor spindle shown or, if the gears are on shafts having centers, on a center fixture. If on centers, a motorized center system 30 (dotted lines) may be used that automatically opens up to accept the part and closes down to lock the centers. The rotary table stays fixed.

If the gears are to be loaded on arbors as is often the case, a separate arbor is often required for each gear inspected. In this case, the arbor's fixtures are also loaded by the robot or a second robot from a fixture supply adjacent to the machine. A fixture design capable of doing this, which serves to illustrate the concept, is shown in FIG. 5.

Once loaded, the gear is rotated in place and the sensor unit measures any or all of the various gear variables. These are typically involute form, tooth space error and lead; or in spur gears, tooth parallelism to the center axis of the gear.

For most smaller gears, the involute and tooth spacing can often be measured with no movement of the sensor at all once positioned, relative to the center axis for that gear usually with the sensor middle range on the gear pitch line. When the gear is first loaded in, the sensor moves to its nominal standoff position located typically on the pitch circle of the gear from which it can measure $+/-$ deviations in order to obtain involute form and tooth space.

If lead is desired, the single sensor such as 4 shown is moved vertically along the axis of the gear. In order to perform a lead check, the gears may be stopped or rotating.

Alternatively, multiple sensors can be stacked in order to provide a multi-point lead check approximation along the tooth. If such a stack is used no sensor movement along the gear vertical axis is required to obtain lead data directly at high speed as the gear is rotated.

Figure 1B:
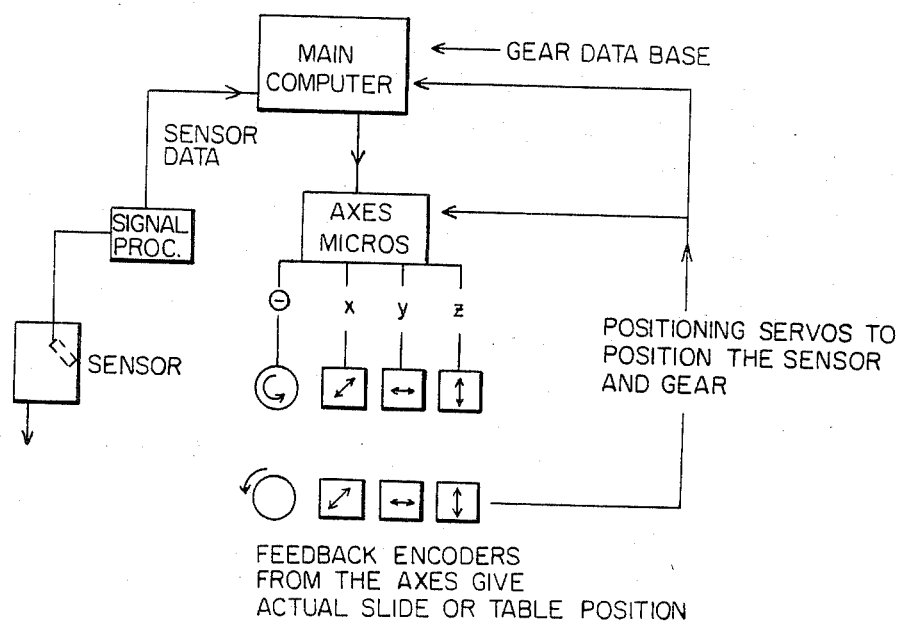
FIG. 1B illustrates a computer control system according to the invention.

As shown in FIG. 1B, the control steps are as follows:
1. Computer has stored within it the nominal shape coordinates of the gear teeth.
2. Computer down loads coordinate position data to microprocessor(s) controlling the rotary and linear axes which rotate the gear and position the sensor unit to be a known distance from the location of a perfect gear surface.
3. the sensor then reads the location, one or more points, on the tooth surfaces of the test gear and provides the deviation from the perfect gear value.

Alternatively, if tooth space error, or pitch line runout are measured, the sensor is positioned at a known distance from the nominal pitch line of the gear and deviations in location of these points are measured as each tooth is rotated into view.

If the sensor has a large enough range (e.g. 5–8 mm, sutiable for small automotive gears) this procedure can also be used to check complete involute (for other) form of the teeth as well. Note that typically the gear is rotated in $\theta$, with the sensor moved in x,y and z. For smaller gears, it is often convenient to move the gear in one of the translational axes (e.g. z) letting the sensor move only in the two remaining axes (x and y).

Figure 2A:
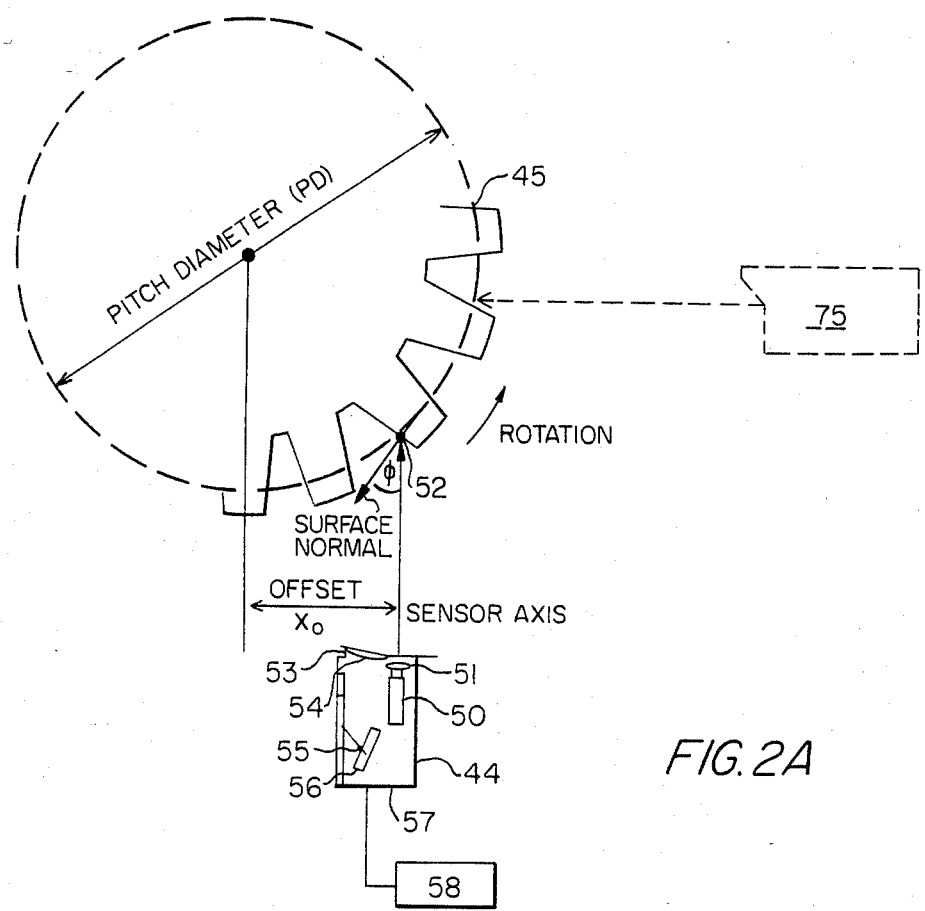
FIG. 2A illustrates preferred geometric relationships advantageously utilized in sensing gears in such a machine.

Let us consider the operation geometry of a sensor such as 44, shown in FIG. 2A. This sensor is comprised of laser 50, whose beam is focused by lens 51 to project a spot, line, or other zone of radiation 52 on an instantaneous portion of a tooth of gear 45. Lens 53 forms, via flat mirror 54, (employed only to provide a more rectangular package size) an image 55 of zone 52 on detector array 56. All elements are typically located in housing 57. A microcomputer and hardware processing circuits 58 are typically used to analyze the array outputs to determine the position of spot 52 and, therefore, the surface of the gear (see also co-pending application Ser. No. 163,290, now U.S. Pat. No. 4,394,683 "New photodetector array based optical measurement systems").

The angles of incidence on the gear 45 are important and we have found them to be preferably different than described in copending application Ser. No. 34,278. Instead, it has been found that angles and offsets ($x_o$) as described in the FIG. 2 work the best, where it is generally preferable to use a range of angles $\phi$ from 0° to 45° and offsets from $0.1 \times PD$ to $0.75 \times PD$. These angles and offset are necessary to obtain access to the teeth to obtain sufficiently intense and uniform lighting over the tooth to allow high speed, accurate operation. Directing the light incident along the radius of the gear has generally been found not to work as well.

It is often desirable to have a dual headed sensor or an additional sensor channel such as 75 in FIG. 2A (dotted lines) located to optimally view the opposite sides (i.e. coast and drive) of the teeth. Because of certain precluded angles, it is often necessary to actually have two sensors (e.g. 44 and 75) located at different angles. These sensors can be side by side, or spaced as shown, or 180° apart etc.

Figures 2B, 2C:
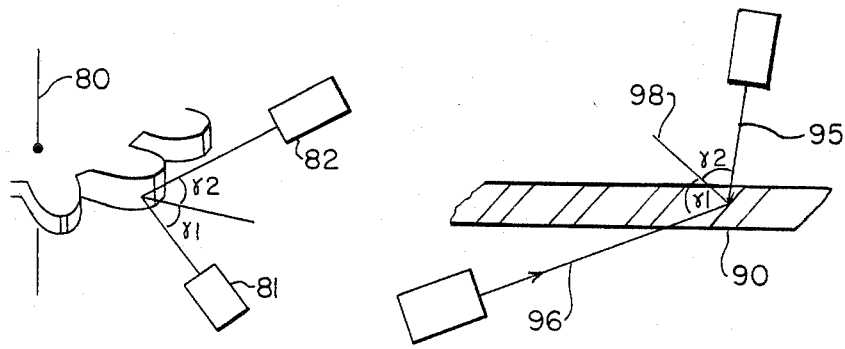
FIGS. 2B and 2C illustrate ALTERNATIVE INCIDENCE ANGLES

Note too that the sensing unit can also be disposed at an angle $\delta$ as well relative to a plane perpendicular to the axis 80 of the gear (FIG. 2B). In this case, the light directing means (81) containing the laser and focusing means and receiving means (82) containing the image forming lens and detector array portions cannot generally be co-located but are spaced at angles $\delta_1$, and $\delta_2$ respectively to the plane perpendicular to the gear axis. Where $\delta_1 \cong \delta_2$ light reflection is generally maximized as is desirable for high speed operation.

For helical gears 90, as in FIG. 2C it is also sometimes desirable to cant the sensor axis 95 and projection axis 96 relative to the tooth surface normal 98 rather than to the gear axis.

Highly desirable, in this or other triangulation based measurement of contoured surfaces, is to provide suitable data processing such as curve fits. This allows variations in the surface finish to be essentially averaged out of the measurements, for example in computing involute or lead errors, which sometimes can occur in triangulation based systems due to speckle and other still unknown causes which we have found in our testing to be sometimes in the area of 2–3 um. The errors are generally random and can be eliminated by curve fitting or averaging using computer 58.

For example, consider FIG. 3 showing effectively 8 points 101–108 taken on the involute surface of gear tooth 110 at (a) various angles of $\theta_{101}$, $\theta_{102}$... etc. of gear rotation or (b) various x axis translation positions relative $x_{101}$... etc. to the gear tooth.

These points can be obtained by:
1. Scanning out the photodetector array to determine zone image location when the rotation encoder says a new angular increment has arrived, e.g. $\theta_{102}$
   (a) Where all scans are dumped except the one just after the $\theta$ strobe pulse (e.g. from encoder 35)
   (b) Where the integration time between scans is lengthened to an average of zone images from over closely spaced points on the tooth surface $\Delta\theta$, which is scanned out immediately on receipt of the strobe pulse.
2. Where a pulsed laser source is used to strobe light burst on command of the encoder at the exact $\theta$ position, and the scan strobed to read out thereafter.
3. Where all data points possible at the array scan rate used are taken on the tooth surface—e.g. 80 points, not 8 within 1/10 sec., at a 800/sec. scan rate (i.e. 10 additional points between points $\theta_{101}$ and $\theta_{102}$ etc. in FIG. 3) and a curve fit made in the computer.

All techniques have been used successfully, however, the curve fit is useful as it allows surface finish effects, including isolated dirt, to be ignored. So does the lengthened integration time approach, which averages these effects. However, some blurring occurs. Enlargement of the light spot size can also provide an average of surface effects and dirt at the cost of less spatial resolution. However, with appropriate curve fitting, resolution can be enhanced. Ideal light spot sizes range from 0.02 to 0.3 mm depending on the gear tooth size and surface condition.

The fastest technique, with no blur, is the pulsed version of item 2 above, where the scan rate can be such that sequential scans occur at $\theta101$, $\theta102$ etc. with no integration time in-between, using super fast 200 nsec. diode laser pulses. Thus an array such as Reticon 1728H capable of 1000 scans/sec, 8 points per tooth face could do a 20 tooth gear (40 faces) in under $\frac{1}{2}$ second!

The curve fit technique can generally work where we have sufficient number of data points to allow an accurate fit which is then compared to the theoretical or master reading for the tooth to get the common involute (or lead) deviation chart.

A sensor design that allows very high range and high speed necessary for practical operation of these machines in in-line operation is shown in FIG. 4. A dual channel version is shown one for each side of the tooth.

Diode laser 150 is imaged by lens 151 to form a rectangular line 0.15 mm wide on tooth 152. Range of the sensor is 8 mm with resolution better than 1 micron, achieved by a Reticon 2048M element diode array (160, 161), 2:1 lens magnification and 2:1 diode array tilt magnification. A 8:1 centroid or peak detecting circuit amplification spot position is also achieved. Stand-off distance to the gear surface is 75 mm.

This sensor unit utilizes a photo diode array of high speed. While lower speed units such as the 1728H can be utilized, it is preferable to use the large very high rate arrays such as Reticon 2048 or 4096 detector diode arrays which use four tapped output lines. These are then combined to provide a measurement speed in the area of let us say 8,000 scans per second when a powerful 40 miliwatt diode laser source such as 150 is utilized. Such high scan rates allow rapid rotation of the gear typically at speeds up to 20 teeth/sec. without excessive blur. Some blurr however can be tolerated as discussed in the section above.

It should be noted that other light sources can be used such as a visible gas laser and in any case a laser may be remoted via wave guide fiber optics as well. While possible, it is not generally practical to use non laser sources as they do not have sufficient intensity to allow high speed operation required.

FIG. 5 illustrates an example of such a gear sensing unit 300 located on a gear grinding machine. In this case, gears 301 are being ground by wheel 305 while at a position generally diametrically opposite, an already ground tooth is being inspected. Performing such inspection at this operation is desirable because the gear is fixtured on the very machine that's making it and any corrections required can be made immediately on the machine.

In order to effect the measurement, the gear is rotated and the sensor moved if necessary as in the previous case. It is noted for large gears that sensor movement in the radial or x direction will also be required since the sensor by itself generally cannot have a range big enough to cover the total height of the largest teeth at high resolution. However, the large gears are obviously made at a slower rate and, therefore, the time required is not of difficulty.

The feedback signal from the computer 310 is fed to the machine in order to position the grinding wheel to allow either subsequent teeth to be corrected, or upon the index of the measured tooth back into a machining position from the inspection location an actual trim pass to be made on the incorrect tooth to improve its shape. This could be done on purpose, with a first rough finish cut and then a super finish cut for example after measurement. Indeed, a separate trim wheel 350 can be utilized just for this purpose. This wheel desirably is located close to the measurement position to minimize movements.

It is clear that in some machining opertions, contamination due to coolant on the part or sensor is a problem. Because of this, blow-offs on the sensor are optimally desirable and it is noted that an air purge 315 can be utilized which gnerally allows the gear or sensor window to be kept clean. When measurement is not in effect, a shutter 320 can also be additionally enclosed to keep direct spray out of the sensor unit.

Sensors such as 44 (FIG. 2A) are also capable of being stacked with several sensors in the vertical axis so multiple involute dimensions along the lead direction can be measured simultaneously. This is particularly simplified when the sensor packages are made as thin as possible. For example, sensor 44 with a diode laser or fiber remoted laser can be 15 mm high. If the image is also remoted, it can be 10 mm. This allows 5 sensors to be packed in on a 50 mm long tooth. Consideration of 5 readings along the axis of the tooth is sufficient for good lead data. Even higher packing can be made if each sensor is staggered at different rotational locations.

FIG. 6 illustrates use of such sensing to perform a scan in the vertical direction to determine lead, for example, at the pitch diameter. As the gear 400 is rotated, the 'beam' 401 from laser 402 travels down the tooth at the pitchline and comparison of the angle data from the encoder 410 to the diode array 411 image spot range data and z axis data gives gear lead, which is generally compared in the computer to get lead deviation relative to a master.

Magnification of zone movement in the sensors used in this disclosure can be derived from tilting the array relative to the imaging lens axis at an oblique angle and/or optical lens/mirror magnification. While the multi-threshold centroid finding approach (disclosed in Ser. No. 34,278, now U.S. Pat. No. 4,373,804) can find the centroid even if the spot image is broadened due to an out of focus condition. A central question is how to achieve a relatively small and constant image zone over the total range of measurement.

The zone image width W (FIG. 7) can be kept constant by matching the array tilt and the imaging lens magnification to the laser beam focusing lens convergence (or divergence after the focal point). For example, as shown in FIG. 7, illumination from a laser or other light source is focused by lens 500 onto the gear surface 501 at angular position $\theta_1$, and to the gear surface at a subsequent time 502 after rotation represented at position $\theta_2$. Because of the convergence of the focus, the zone width on the gear at $\theta_1$ is larger than at $\theta_2$. In order to equalize this effect in the zone images formed by lens 503, the array or image scanning detector 510 is tilted relative to the axis 504 of lens 503 such that $W_2$ is relatively equal to $W_1$. This allows the processing circuitry in readout 512 to be optimized for a certain limited range of zone widths.

FIG. 8 illustrates a robotically changeable fixture design 600 for gears, containing a ball arbor 601 for the gear 602 (dotted lines). A taper or other mating/locking surface 605 is provided together with a lip or other provision 610 for a drawbar (such as 611) to expand onto and so pull the fixture 600 down into the mating taper (or other mating surface) 620 of the rotary table 630.

Drawbar 611 is activated by hydraulic or electromechanical means under control of computer 10 (FIG. 1A) when the robot 20 has deposited the new fixture 600 on the table 630. The drawbar action seats and locks the new fixture allowing a new type of gear to be loaded on by the robot, from line 21.

Such interchangeable fixtures are required for many gears if such machines are to be run on flexible gear lines.

Previous embodiments have illustrated sensors located outside the arc of the gear teeth rotation, which is desirable where possible. However, FIG. 9 illustrates another embodiment of the invention with a sensor 'probe' having an angled viewing capability for going down between the teeth in order to contour same. In this instance, any offset or any convenient angle can be used. One can also translate the sensor in y and rotate the gear in $\theta$ simultaneously to cause a scan to be made of the tooth. Alternatively, the gear can be stationary and the sensor probe moved in y, or x and y to effect tooth contour.

As shown, beam 700 from laser (not shown) strikes mirror 701, and is focussed by lens 702 through window 703 onto the gear tooth 704. Scattered and reflected radiation 705 from the tooth surface passes through window 706 in the wall of housing 707 and is imaged by lens 708 onto array 710. Array processing determines the spot centroid as before.

The term 'light' in this disclosure means all electromagnetic radiation, ultra violet, visible and infra red.

Suitable lasers for use with the invention are, for example, Spectra Physics Model 136 HeNe gas laser, power 2 mw, and cw diode laser, Laser Diode Labs (LDL) LCW 10, and for pulsed operation an LDL LD-67.

It is noted that the machine of FIG. 1 equipped with sensors such as FIG. 4 is capable of contouring not just the normal tooth form, but also the fillet radius at the bottom of the tooth—an area critical for strength.

The optimal sensor for small gears as shown in FIG. 4 has a range of 5-8 mm, resolution 0.5 to 1 micron and a standoff roughly 5-10 times the range.

While photodetector arrays are the prefferred detectors for image zone position determination, other detectors may be used, for example, analog spot position detectors such as UDT SC-10s.

Such gear inspection machines according to the invention are valuable because they give for the first time, information as to tooth height and fillet radius of value to designers, plus provide rapid flexible inspection of gears in production.

In FIG. 7, the gear surfaces have been shown on the converging side of the focal point of lens 500. It is also possible to have them on the diverging side with different diode array locations and tilt angles chosen. The magnification changes and focus changes due to array tilt are considered with the input lens (500) focal length to determine optimum locations.

It is noted that systems using tilted arrays (or other photodetectors) to improve magnification and/or zone widths, require calibration in general to account for the variation in magnification through the range. This can be accomplished in the FIG. 7 by moving a surface such as the tooth shown through a known locations (e.g. from position 1 to position 2) and recording in the computer the corressponding image spot positions on the detector. Even though the arrays are digital devices, most highly accurate systems such as those used for gear inspection need to be so calibrated to eliminate lens errors and other miscellaneous variables.

The control system of FIG. 1B is set up to allow gears to be positioned and programably inspected by entering into the computer the gear type A software program then determines the initial and subsequent (if any) slide positions and rotational encoder movements and speeds for that gear, and causes the fixture to be changed if required and the gear to be loaded. Data taken is compared to a master data base for that gear.

Typical slides and rotational encoders usable for this invention are those made by the Anorad co. These typically have 0.5 micron per count linear encoders, and 2 arc second rotary encoders.

What is claimed is:

1. A method of determining gear geometry comprising:
   (a) providing a gear in an inspection position, said gear having a gear axis;
   (b) providing a light source for projecting a zone of light onto a surface of a gear at a first surface location, said light being projected onto said surface in a direction whch is offset from a gear radius when viewed along the gear axis;
   (c) providing a light detector for detecting a image of said zone of light;
   (d) determining the position of a detected image of said zone of light;
   (e) determining from the determined image position, the location of the gear surface on which said zone of light was projected;
   (f) moving said gear relative to said light source such that said light source is positioned to project a zone of light onto said gear surface at a second surface location different from said first surface location;
   (g) repeating steps (b) through (f); and
   (h) determining, from a plurality of determinations of the location of the gear surface on which said zone of light was projected, geometry of said gear.

2. A method according to claim 1 further comprising automatically controlling steps (b) through (h).

3. A method according to claim 2 wherein said controlling step comprises:
   entering the type of gear;
   determining, from the entered gear type, correct inspection positions for said light source and light detector relative to a gear located in said inspection position; and
   automatically positioning said light source and light detector at said correct inspection positions relative to said gear.

4. A method according to claim 1 wherein said light source and light detector are provided in a unitary housing.

5. A method according to claim 1 wherein said light detector comprises an image scanning light detector array, said array having an integrating time long than the array scan time.

6. A method according to claim 1 wherein said gear geometry determining step comprises:
   obtaining a series of data points representative of locations of said surface;
   fitting a curve to a series of said data points; and
   comparing said curve to the correct shape of said surface.

7. A method according to claim 1 further comprising lens means for imaging said zone of light onto said detector, and wherein said light detector is canted at an angle, not 90°, to the optical axis of said lens, said cant angle being chosen so as to vary the magnification on the detector as a function of the width of the projected light zone on said surface.

8. A method according to claim 1 wherein the light is projected in a direction which is offset, when viewed along the gear axis, from a line normal to the gear surface at the zone of projected light.

9. A method according to claim 8 wherein light is directed in a direction which is offset from said normal line by an angle of up to 45°.

10. A method according to claim 1 wherein the light is projected in a line which, when viewed along the gear axis, is parallel to a gear radius and spaced therefrom by 0.1 to 0.75 times the gear pitch diameter.

11. A method according to claim 1 wherein the light is projected in a line inclined to a plane perpendicular to the gear axis.

12. A method according to claim 1 wherein the zone of light is a spot having a diameter of up to 0.3 mm.

13. A method according to claim 1 wherein said light source comprises a pulsed laser.

14. A method according to claim 13 wherein said gear is mounted in a grinding machine.

15. Apparatus for determining gear geometry comprising:
   (a) means for positioning a gear in an inspection position, said gear having a gear axis;
   (b) a light source for projecting a zone of light onto a surface of a gear at a first surface location, said light being projected onto said surface in a direction which is offset from a gear radius when viewed along the gear axis;

(c) a light detector for detecting an image of said zone of light;

(d) means for determining the position of a detected image of said zone of light;

(e) means for determining from the determined image position, the location of the gear surface on which said zone of light was projected;

(f) means for moving said gear relative to said light source such that said light source is positioned to project a zond of light onto said gear surface at a second surface location different from said first surface location;

(g) means for repeating steps (b) through (f); and (h) means for determining, from a plurality of determinations of the location of the gear surface on which said zone of light was projected, geometry of said gear.

16. Apparatus according to claim 15 further comprising means for automatically controlling means (b) through (h).

17. Apparatus according to claim 16 wherein said controlling means comprises:

means for entering the type of gear;

means for determining, from the entered gear type, correct inspection positions for said light source and light detector relative to a gear located in said inspection position; and means for automatically positioning said light source and light detector at said correct inspection positions relative to said gear.

18. Apparatus according to claim 15 wherein said light source and light detector are provided in a unitary housing.

19. Apparatus according to claim 15 wherein said light detector comprises an image scanning light detector array, said array having an integrating time longer than the array scan time.

20. Apparatus according to claim 15 wherein said gear geometry determining means comprises:

means for obtaining a series of data points representative of locations of said surface;

means for fitting a curve to a series of said data points; and means for comparing said curve to the correct shape of said surface.

21. Apparatus according to claim 15 further comprising lens means for imaging said zone of light onto said detector, and wherein said light detector is canted at an angle, not 90°, to the optical axis of said lens, said cant angle being chosen so as to vary the magnification on the detector as a function of the width of the projected light zone on said surface.

22. Apparatus according to claim 15 wherein the light is projected in a direction which is offset, when viewed along the gear axis, from a line normal to the gear surface at the zone of projected light.

23. Apparatus according to claim 22 wherein light is directed in a direction which is offset from said normal line by an angle of up to 45°.

24. Apparatus according to claim 15 wherein the light is projected in a line which, when viewed along the gear axis, is parallel to a gear radius and spaced therefrom by 0.1 to 0.75 times the gear pitch diameter.

25. Apparatus according to claim 15 wherein the light is projected in a line inclined to a plane perpendicular to the gear axis.

26. Apparatus according to claim 15 wherein the zone of light is a spot having a diameter of up to 0.3 mm.

27. Apparatus according to claim 15 wherein said light source comprises a pulsed laser.

28. Apparatus according to claim 27 wherein said gear is mounted in a grinding machine.

* * * * *